July 30, 1968 A. D. LIMIERO ET AL 3,395,256
KEY TELEPHONE CONTROL SYSTEMS
Filed July 29, 1965
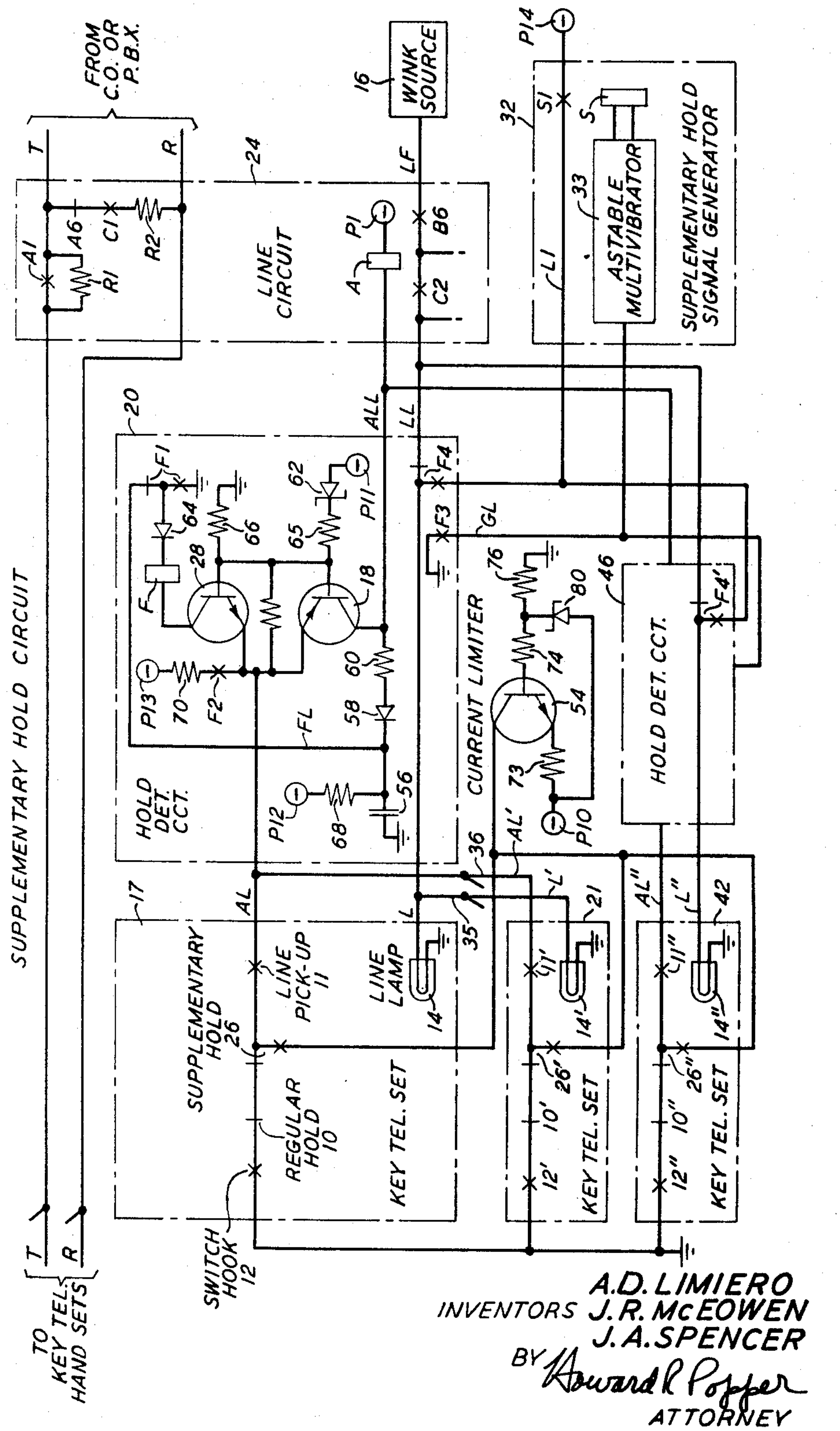
INVENTORS A.D. LIMIERO
J.R. McEOWEN
J.A. SPENCER
BY Howard R Popper
ATTORNEY 3,395,256

KEY TELEPHONE CONTROL SYSTEMS

Albert D. Limiero, Matawan, James R. McEowen, Madison Township, Middlesex County, and Jonathan A. Spencer, Sea Bright, N.J., assignors to Bell Telephone Laboratories, Incorporated, New York, N.Y., a corporation of New York Filed July 29, 1965, Ser. No. 475,676
10 Claims. (Cl. 179—99)

ABSTRACT OF THE DISCLOSURE

A transistorized telephone pushbutton system providing normal and special holding circuits, more than one flashing rate, and two distinct means of retrieving a call from hold.

This invention relates to telephone key circuit systems and more particularly to apparatus for providing signals for more completely indicating the status of any particular line.

The nature of modern business has made conventional hold features an integral part of the telephone services required by the public. In businesses having a number of telephone clerks, each equipped with a key telephone set capable of picking up several lines, two problems sometimes arise when calls are placed on hold. First, a particular telephone clerk may forget which call he placed on hold inasmuch as all held calls cause their associated lamps to flash at the same rate. Secondly, it is sometimes important to accord a different degree of priority to certain held calls over that accorded to other calls which may be disposed of by conventional procedures. An example of the latter situation may be envisioned where it has been necessary to place a call on hold for a second time. In such a situation this call should be given priority treatment either by the clerk who placed the call on hold or by one of the other clerks authorized to handle it. It is apparent that if these somewhat diverse requirements could be satisfied through the use of an inexpensive line lamp control arrangement, a consequent improvement in telephone service would result.

Accordingly, it is an object of the present invention to provide economical and reliable signals for clearly indicating the holding status of a telephone line.

In accordance with one illustrative embodiment of the present invention, a hold detector circuit is provided for selectively responding to the actuation of a conventional hold button to apply conventional lamp illumination signals and to the actuation of a supplementary hold button to apply distinctive lamp illumination signals indicating a priority hold condition. The hold detector circuit may also be utilized to control the application of the distinctive lamp illumination signals only to the lamp associated with the telephone initiating the holding condition. The hold detector circuit is advantageously inserted in the operating path of the holding bridge inserting relay of the line circuit. A hold key (hereinafter called the supplementary hold key) of the holding key telephone set is provided with a set of transfer contacts in lieu of the conventional back contact in the operating circuit of the holding bridge inserting relay. The operation of this hold key at its back contact causes the hold detector circuit to release the holding bridge inserting relay which in turn inserts the holding bridge across the talking conductors in the normal manner. In addition, however, the make contact of the transfer contacts provides an operating path for a relay which is operated to transfer the line lamp illumination path from the conventional flashing hold supply to a supply operated at a distinctive flashing or fluttering rate.

More particularly, a pair of transistors in the hold detector circuit are individually controlled by the hold key so that prior to the operation thereof one transistor is maintained in the normally on condition to keep the holding bridge inserting relay operated (and thereby maintain the holding bridge in the open circuit condition) and the other transistor is maintained in the normally off condition to keep the distinctive flashing circuit disconnected. When the hold key is operated, the normally on transistor is turned off by the back contact of the operated hold key opening its current path. The make contact of the operated hold key completes an operating path to turn on the normally off transistor and operate the relay for connecting the distinctive lamp illumination signals to the line lamp. The operating path of the second transistor includes a capacitor which is kept discharged so long as the first transistor is conducting and which commences to charge when conduction in the first transistor is extinguished. This capacitor provides an initial surge of current through the second transistor which is thereafter provided with a direct current sustaining path by the operation of the relay which provides the distinctive lamp illumination signals. In this manner a single lead which conventionally serves merely to connect the back contact of the hold key with the winding of the holding bridge inserting relay may be used to initiate the application of the distinctive lamp illumination signals, thereby eliminating excessive rewiring of the key telephone sets being equipped with this service.

A feature of the present invention is a hold detector circuit for controlling the application of conventional or distinctive line lamp illumination signals to a key telephone set.

Another feature of the present invention is a hold detector circuit having a pair of relay-controlling transistors selectively operable in accordance with the potential appearing on the hold lead of a key telephone set.

A further feature of the present invention is a hold detector circuit having a transistor controlled capacitor for preventing the application of holding lamp illumination signals by the inadvertent operation of the hold key.

The foregoing and other objects and features may become more apparent by referring now to the following detailed description and drawing, the single figure of which shows an illustrative embodiment of a key circuit system for providing distinctive as well as conventional line lamp illumination control.

The drawing depicts in schematic, detached contact form a key telephone set 17 having the transfer contacts 26 of a supplementary hold key in circuit with the conventional switchhook contacts 12, a regular hold key contact 10, and line pick-up key contacts 11 connected in circuit with hold lead AL. Advantageously, the key telephone sets may be of the type having a plurality of line pick-up keys such as the well-known Call Director manufactured by the Western Electric Company. In the illustrative embodiment, key telephone sets 17 and 21 are provided with supplementary hold keys either of which when operated causes their respective line lamps associated with line circuit 24 to be illuminated at the flutter rate of approximately 720 i.p.m. Key telephone set 42 when its supplementary hold key is operated will only cause its own line lamp 14'' to be illuminated at the flutter rate whereas the corresponding line lamps 14 and 14' of key telephone sets 17 and 21 will be illuminated at the conventional wink rate (120 i.p.m.).

Line circuit 24 which connects the central office (not shown) with the tip and ring conductors of the key telephone sets includes a conventional holding bridge inserting relay A whose contacts A1 and A6 insert the holding bridge including resistors R1 and R2 in the loop circuit. The manner of this operation is more fully described in the copending application of C. E. Morse and J. P. Smith, Ser. No. 246,905, filed Dec. 26, 1962, now Patent 3,239,-610, issued Mar. 8 1966. Briefly however, so long as relay A is operated, resistor R1 is shunted down by operated make contact A1 and resistor R2 is kept out of the circuit by operated back contact A6. Make contact C1 is operated by a relay (not shown) which is operated when relay A is released. When relay A is released, back contact A6 places resistor R2 in circuit between the T and R conductors constituting a holding bridge for maintaining loop continuity to the central office.

*Circuit operation prior to hold*

Prior to the operation of the switchhook and pick-up keys at any of the key telephone sets having a line pick-up key for line circuit 24, relay A is released. Contact C1 is unoperated at this time so that the central office may apply ringing to the tip and ring conductors without the ringing being shunted down by resistor R2. The manner in which the various A1, A6, and C1 contacts are controlled is more fully described in the above-mentioned C. E. Morse et al. application.

In the hold detector circuit 20, at this time, both transistors 18 and 28 are off and capacitor 56 is charged through resistor 68 from potential source P12. Capacitor 56 being charged presents a negative potential to the collector circuit of transistor 28 to prevent this transistor from conducting in the event that the supplementary hold and line pick-up keys are inadvertently operated while the telephone set 17 is still on-hook.

When one of the key telephone sets 17, 21, or 42 associated with line circuit 24 goes off-hook and operates its line pick-up key for line circuit 24, switchhook contact 12 and line pick-up key make contact 11 are operated. A ground is thereupon provided to lead AL over a path which includes the back contact 10 of the regular hold key and the back contact of transfer contacts 26 of the supplementary hold key. The grounding of lead AL provides a ground to the emitter of transistor 18, turning this transistor on. The base-emitter junction of transistor 18 is provided with forward bias from source P11 through resistor 65 and Zener diode 62. The current path to the collector of transistor 18 is completed to source P1 of line circuit 24 in series with the winding of the holding bridge inserting relay A. The base-emitter junction of transistor 28 is back-biased at this time and transistor 28 remains nonconducting. Accordingly, it is seen that the operation of the switchhook and line pick-up key of key telephone set 17 operate line circuit relay A to open-circuit the holding bridge resistor R2.

When transistor 18 is turned on the potential at its collector approaches the ground potential applied to its emitter on lead AL. Diode 58 is forward-biased and capacitor 56 which had priorly charged through resistor 68 to the negative potential of source P12 is now discharged by transistor 18 through resistor 60.

*Application of conventional hold*

If now the regular hold key 10 is operated, its back contact open-circuits the ground operating path for transistor 18 and relay A causing conduction in the transistor to be extinguished and relay A to be released. Relay A released at its back contact A6 places resistor R2 in circuit between the T and R conductors as a holding bridge which maintains loop continuity to the central office. Conventional lamp illumination power is applied to line lamp 14 by conventional wink power source 16. The path for the conventional lamp illumination power within line circuit 24 includes make contacts C2 and B6 which belongs to line circuit 24 relays not explicitly shown in the drawing. As described more fully in the above-mentioned copending application, contact C2 is operated when relay A is released and contact B6 is operated whenever the line is picked up and off-hook. In addition to line lamp 14 of key telephone set 17, each of the line lamps of the other key telephone sets 21, 42, etc. having a pick-up key for line circuits 24 is also illuminated. The line lamp 14′ of key telephone set 21 receives its wink power through multiple connection to lead 35. The line lamp 14″ of key telephone set 42 receives its wink power over the back contact of transfer contacts F4′ of hold detector circuit 46 by multiple connection to lead LL.

The release of relay A, as described above, is accomplished by the operation (downstroke) of the regular hold key. When the regular hold key is released, it, in turn, by mechanical linkage (not shown) releases the line pick-up key. Accordingly, when the hold key is fully released, lead AL is prevented from being grounded by the released line pick-up key make contact 11 which disconnects lead AL from ground.

When conduction in transistor 18 was extinguished by the operation of regular hold key back contact 10, capacitor 56 commenced to charge again through resistor 68. In so doing, it temporarily presents a ground over the back contact of transfer contacts F1 and diode 64 through the winding of relay F to the collector of transistor 28. When the hold key is released, it causes the line pick-up key to be released in the conventional manner by mechanical linkage (not shown). Accordingly, when regular hold key back contact 10 is released, lead AL is maintained open-circuited by the released make contact 11 of the line pick-up key. Transistor 28 cannot operate at this time, however, since lead AL is open-circuited.

The hold condition is retired by depressing the line pick-up key to operate line pick-up key make contact 11 at either key telephone set 17 or at any of the other key telephone sets 21, 42 associated with line circuit 24. The line pick-up key, at its operated make contact 11, restores ground to lead AL to recomplete the operating path for transistor 18 and relay A. The manner in which the hold condition is retired by operation of the line line pick-up key at telephone set 21 is evident from the description pertaining to the operation of the line pick-up key at telephone set 17. The hold condition is retired by operation of the line pickup key at telephone set 42 which turns on a transistor 18″ (not shown) of hold detector circuit 46 in corresponding manner to that in which transistor 18 of hold detector circuit 20 would be turned on. When this transistor 18″ is turned on it completes an operating path for relay A of line circuit 24 by multiple connection to lead ALL.

*Application of distinctive or priority hold*

As alluded to above, the operating requirements of the key telephone set user may necessitate that on certain held calls a distinctive lamp illumination signal should be applied to assign a priority status to the held call. To place the call in the priority hold condition, the supplementary hold key is operated. At the back contact of transfer contacts 26 of the supplementary hold key, ground is removed from the AL lead as the key is depressed. At the make contact of transfer contacts 26, the AL lead is connected to the collector of transistor 54. Transistor 54, however, cannot provide the operating ground required to sustain conduction through transistor 18 and, accordingly, transistor 18 is turned off causing relay A in line circuit 24 to release. When relay A releases its back contacts A6 insert the holding bridge resistor R2 between conductors T and R. Prior to the release of the supplementary hold key, however, the make contact of transfer contacts 26 completes a path in the forward direction for transistor 28 through the collector-emitter junction of transistor 54 and resistor 73 to potential source P10.

It will be recalled above that conduction in transistor 18 maintained capacitor 56 discharged. When conduction is terminated in transistor 18, capacitor 56 initially presents a ground to the collector of transistor 28. This temporary ground applied to the collector of transistor 28 is sufficient to establish conduction in transistor 28 as soon as the supplementary hold key is operated. Transistor 54 is biased to its saturated state by resistors 74 and 76 and Zener diode 80 to act as a current limiter in the event that the switchhook and pick-up keys happen to be simultaneously operated at any of the other key telephone sets 21, 42. Transistor 54 accordingly prevents source P10 from being short-circuited to ground in this event. When transistor 28 is permitted to turn on, relay F in its collector circuit operates. The operation of relay F, at the make contact of its transfer contacts F1, provides a direct ground connection which supplants the temporary ground provided by capacitor 56. Make contact F2 provides a direct path for the emitter of transistor 28 in series with resistor 70 to potential source P13 supplanting the path provided through transfer contacts 26 and transistor 54.

When the supplementary hold key is released, it mechanically releases the line pick-up key which, at its released make contact 11, prevents lead AL from being grounded by the key telephone set. Transistor 28 is maintained conducting over the path completed by the aforementioned operated make contacts of the F relay. Relay F operated, at the back contact of its transfer contacts F4, disconnects wink power source 16 from the line lamp and, at its make contact of transfer contacts F4, connects the line lamp to the supplementary hold signal generator 32. Relay F, at its operated make contact F3, connects a start ground to lead GL of the supplementary hold signal generator. The ground on lead GL causes astable multivibrator 33 to operate relay S at a distinctive fluttering rate. Relay S controls its make contact S1 at the fluttering rate to connect potential source P14 to the line lamp. Accordingly, line lamp 14 is operated at a distinctive fluttering rate indicating the priority hold condition.

The priority hold condition may be retired by reoperating the line pick-up key at key telephone set 17 to restore ground to lead AL. The grounding of lead AL by operated make contact 11 shunts down potential source P13, turning off transistor 28. Transistor 28 being turned off, causes relay F to release. Relay F released, disconnects the supplementary hold signal generator 32 from line lamp 14. The reapplication of ground to lead AL causes transistor 18 to be turned on, restoring the operating path to relay A of line circuit 24. Relay A being reoperated removes the holding bridge from the tip and ring conductors. The line is accordingly returned to the talking condition.

Alternatively, the priority hold condition may be retired by operating the line pick-up key at key telephone sets 21 or 42. In the case of operating the line pick-up key at set 21, transistor 18 of hold detector circuit 20 is turned on by the application of ground to lead AL through the multiple connection of set 21's pick-up key to lead 36. In the case of operating the line pick-up key at set 42, lead AL'' is grounded to hold detector circuit 46 whose transistor 18'' (not shown) is turned on to complete an operating path to relay A of line circuit 24. The grounding of lead ALL causes transistor 18 of hold detector circuit 20 to be turned on in the "reverse" direction. That is, its collector-base junction is forward-biased by the ground on lead ALL and since its emitter is connected to negative potential P13 in series with resistor 70 and make contact F2, transistor 18 turns on. Transistor 18 in turning on grounds the emitter of transistor 28 causing this transistor to turn off and release relay F. Relay F in releasing, at its now released make contacts F1, opens the conduction for transistor 18 and transistor 18 turns off.

In one illustrative embodiment, transistor 18 was a Western Electric Company type 12G, resistor 70 was 680 ohms, transistor 28 was a Western Electric Company type 16G, and potential P had a value of −24 volts.

Hold detector circuit 20 has been described for operation with a plurality of key telephone sets 17, and 21, each of whose line lamps for line circuit 24 is simultaneously provided with the distinctive fluttering illumination signal by the operation of the supplementary hold key at any of the telephones. Hold detector circuit 46, however, is utilized to provide a distinctive hold signal only to the line lamp 14'' of key telephone set 42 to prevent the telephone clerk at this key telephone set from forgetting which line he placed on hold. When the supplementary hold key at telephone set 42 is operated, a transistor 28'' (not shown) corresponding to transistor 28 of hold detector circuit 20 is turned on and operates its corresponding relay F'' (not shown) to start supplementary hold signal generator 32 and apply flutter illumination to line lamp 14''.

It is to be understood that the above-described arrangements are merely illustrative of the principles of this invention and various other arrangements may be devised by those skilled in the art without departing from the spirit and scope of the invention.

What is claimed is:

1. Apparatus for selectively controlling line lamp illumination of key telephone sets comprising a first and a second transistor, lamp power source connecting means respective to each of said transistors, means for normally maintaining said first transistor and its respective lamp power source connecting means operated and said second transistor and its respective lamp power source connecting means unoperated during the off-hook condition of said line, means responsive to operation of said first transistor for preparing an operating path to said second transistor, means for turning off said first transistor to release its respective connecting means, and means controlled by said preparing means and said turning-off means for operating said second transistor and its associated connecting means.

2. Apparatus according to claim 1 further comprising means for applying a current to reoperate said connecting means respective to said first transistors and to turn off said second transistor.

3. Apparatus according to claim 2 wherein said last-mentioned means includes means for temporarily operating said first transistor in the reverse current direction.

4. A telephone key circuit relay controlling apparatus comprising a pair of opposite-conductivity type transitsors connected together at a common point.

relay means respective to each of said transistors, means for applying a first potential to said common point to operate a first of said transistors and its associated relay means, means for applying a second potential to said common point to turn off said first transistor and release its associated relay means, capacitor charging circuit means controlled by said first transistor and effective to turn on said second transistor when said second potential is applied, and means connected between said first transistor and its respective relay means for applying a potential to reoperate said relay and turn off said second transistor.

5. A telephone key circuit relay controlling apparatus according to claim 4 wherein said means for applying said first potential and said means for applying said second potential include a telephone key circuit hold lead connected to said common point, and a set of hold key controlled transfer contacts having its movable contact connected to said hold lead.

6. A telephone key circuit relay controlling apparatus according to claim 4 wherein said relay means respective to said second transistor includes means for controlling said means for applying said second potential.

7. A telephone key circuit relay controlling apparatus according to claim 4.

wherein said potential applied by said means connected between said first transistor and its respective relay means is of the same polarity as the potential applied by said first potential applying means.

8. A telephone key circuit relay controlling apparatus according to claim 4 wherein a said capacitor charging circuit means includes a connection to an element of said second transistor remote from said common point and wherein said means connected between said first transistor and its respective relay means is connected to an element of said first transistor remote from said common point.

9. Apparatus for selectively controlling line lamp illumination of a plurality of key telephone sets associated with a particular telephone line, said telephone sets sharing a common hold lead comprising means at said sets for selectively applying a plurality of temporary signaling conditions to said common hold lead, means connected to said common hold lead and responsive to respective ones of said signaling conditions for applying corresponding distinctive line lamp illumination to the line lamps of said sets associated with said particular line, a further key telephone set associated with said particular telephone line and having a hold lead divorced from said common hold lead, and means connected to said last-mentioned hold lead for applying distinctive line lamp illumination to the line lamp of said further telephone set.

10. Apparatus according to claim 9 wherein said last-mentioned means includes means for controlling said means connected to said common hold lead to cancel said corresponding distinctive line lamp illumination to the line lamps of said sets.

No references cited.

WILLIAM C. COOPER, *Primary Examiner.*

D. L. STEWART, *Assistant Examiner.*